(12) United States Patent
Barron et al.

(10) Patent No.: US 6,857,515 B2
(45) Date of Patent: Feb. 22, 2005

(54) CENTRIFUGAL CLUTCH

(75) Inventors: Brenton H. Barron, Corning, NY (US); Steven M. Averill, Beaver Dams, NY (US)

(73) Assignee: The Hilliard Corporation, Elmira, NY (US)

( * ) Notice: Subject to any disclaimer, the term of this patent is extended or adjusted under 35 U.S.C. 154(b) by 0 days.

(21) Appl. No.: 10/421,620

(22) Filed: Apr. 22, 2003

(65) Prior Publication Data

US 2004/0211642 A1 Oct. 28, 2004

(51) Int. Cl.$^7$ .......................... F16D 43/18; F16D 13/72
(52) U.S. Cl. .............................. 192/105 BA; 192/113.2
(58) Field of Search ...................... 192/105 BA, 103 B, 192/113.2, 113.23

(56) References Cited

U.S. PATENT DOCUMENTS

| | | | | | |
|---|---|---|---|---|---|
| 2,886,154 | A | * | 5/1959 | Conlee ................. | 192/105 BA |
| 3,026,980 | A | * | 3/1962 | Hoff ..................... | 192/105 BA |
| 3,610,382 | A | * | 10/1971 | Makinson ............. | 192/105 BA |
| 3,971,463 | A | * | 7/1976 | Zindler ................. | 192/105 BA |
| 4,625,849 | A | * | 12/1986 | Gommel ............... | 192/105 BA |
| 4,819,779 | A | * | 4/1989 | Nickel et al. ......... | 192/105 BA |
| 5,680,920 | A | * | 10/1997 | Jansson et al. ........ | 192/105 BA |
| 2002/0148701 | A1 | * | 10/2002 | Nickel .................. | 192/105 BA |

OTHER PUBLICATIONS

Max–Torque web–site materials, http://www.maxtorque.com, 15 pages total, including: Max–Torque homepage, http://maxtorque.com, 2 pages; Max–Torque clutches, http:/maxtorgue.com/html/clutches.html, 2 pages; "SS (Six Shoe) Clutch", http:/maxtorgue.com/html/ss_clutch.html, 1 page; "Max–Torgue 4–Cycle Racing Clutches", http://www.max-torque.com/html/racing.html, 5 pages; and "Selection Manual," http://www.maxtorque.com/lehane/html/selection.html, 5 pages. All undated but acknowledged as being earlier than the filing date of the instant application.
"Clutch Maintenance," Max–Torque, 1 page, dated Aug. 1995.
"Centrifugal Clutches," Comet Industries, http://www-.tecumsehuk.co.uk/tec1/cometccf.htm, 2 pages, undated but acknowledged as being earlier than the filing date of the instant application.
"Centrifugal Clutches," Noram web site materials, http://www.norman–clutch.com/clutches.htm, total 11 pages, including: "4000 Series," http://www.norman–clutch.com/clutches4000series.htm, 2 pages; "We Series," http://www.norman–clutch.com/clutchesweseries.htm, 2 pages; "Heavy Duty 1600 Series," http://www.normal–clutch.com/clutches1600series.htm, 2 pages "Industrial 1800 Series," http://www.norman–clutch.com/clutches1800series.htm, 2 pages; and "Heavy Duty 6000 Series," http://www.notman-clutch.com/clutches6000series.htm, 2 pages.

* cited by examiner

Primary Examiner—Rodney H. Bonck
(74) Attorney, Agent, or Firm—Drinker Biddle & Reath LLP (57) ABSTRACT

A centrifugal clutch including a driver adapted to engage and be rotated by an input shaft, a drum adapted to engage a driven component, a plurality of shoes located between the driver and the drum, and a plurality of springs, each spring engaged with adjacent shoes for urging the shoes together. The shoes are radially movable between an outward position in which the shoes contact the drum and an inward position in which the shoes are spaced apart from the drum. Each shoe has an engagement surface which is arranged to contact the drum, and a support. One end of the support is attached to the engagement surface and the other end extends radially inward. A pair of spring attachment mounts are formed on the radially inward end of the support. Each spring is engaged with one spring attachment mount on a shoe.

20 Claims, 10 Drawing Sheets

CENTRIFUGAL CLUTCH

FIELD OF THE INVENTION

The invention relates to centrifugal clutches and, more particularly, to an improved centrifugal clutch design with increased operational life.

BACKGROUND OF THE INVENTION

A centrifugal clutch typically includes a driver or impeller configured so as to be rotated by an external power or driving source, a hollow drum coaxial with and disposed about the driver and configured to drive an external load, and one or more shoes located within the drum that are rotated relative to the drum by the driver. The shoes are generally adapted to move radially into and out of frictional engagement with the inside of the drum. The frictional engagement with the drum provides load transmission between the driver and the drum.

The shoes are typically urged towards the center, away from the drum, by one or more springs. As the driver and the shoes rotate, the centrifugal force created by the rotation urges the shoes radially outward. When the speed of rotation is sufficiently high, the centrifugal force acting on the shoes overcomes the force of the springs, urging the shoes to move outward and engage the drum. The engagement of the shoes with the drum causes the drum, and thus, the external load, to rotate in combination with the shoes. The speed at which the clutch engages is, therefore, determined by a balance between the mass distribution of the shoes and the strength of the springs.

Centrifugal clutches are commonly used in the drive trains of machines powered by small internal combustion engines for producing varying amounts of horsepower. These types of clutches have particular use in lower horsepower machines, such as wood chippers and go-karts, which typically operate at up to about 20 hp. The clutch is typically set to disengage when the engine is idling, and to engage when the engine is generating sufficient torque to drive the load effectively.

However, since the engagement between the shoes and the drum is based on friction, there is always a certain degree of slippage that occurs. For example, when the centrifugal force first overcomes the spring force, the initial contact between the moving shoe and the stationary drum will result in slippage. As the speed of the motor increases, the centrifugal force should eventually produce sufficient friction to prevent slippage. However, until that speed is attained, there will be relative movement between the shoes and the drum. This slippage is necessary to some degree to provide for a gradual acceleration of the driven component.

In situations where the engine is operating at a fairly low speed the slippage may continue for some time. This produces a considerable amount of friction which, in turn, results in the generation of heat. The highly-resilient steel from which springs are typically made is not very heat-resistant. To compound this, the springs are necessarily under considerable stress since they are fighting the centrifugal force imposed on the shoes. It has been found in practice that a slipping centrifugal clutch can easily generate sufficiently high temperatures to cause the metal of the springs to creep. As the springs creep, their spring force decreases, which then allows the shoes to engage at lower rotational speeds. The heat can also become sufficiently high so as to change the temper of the metal, further weakening the spring.

A decrease in the speed at which the clutch engages is generally undesirable, and in some cases unacceptable. For example, if a spring relaxes considerably, the shoes can engage the drums at even an idling speed. This can cause the driven component to begin to move when the engine is idling. In some instances, this can be an unacceptable safety concern. For example, in a go-kart, movement of the vehicle at idle, when people are typically getting into or out of the go-kart, can be very dangerous. Alternatively, the engine may stall if the clutch engages before the engine is producing sufficient torque to drive the load.

In one conventional centrifugal clutch, a single garter spring is used to hold the shoes radially inward. The garter spring is seated in slots, extending in a generally circumferential direction, on one side of the shoes. The garter spring is located close to the frictional surfaces of the shoes. As a result, the heat generated by the shoes transfers readily to the spring, reducing its operating life. It has been found with one centrifugal clutch of this type used in a transmission of a go-kart that the garter spring can relax sufficiently to affect the performance of the vehicle in as little as 30 minutes of driving.

In another conventional centrifugal clutch, separate coil springs are attached between each shoe and its neighbors. In this clutch, the ends of each spring are hooked into holes formed in the shoes. These hooks, and especially the bend where the hook joins the coiled part of the spring, are the most highly stressed parts of the springs. Also, because of their location relative to the shoes, the hooks heat up more than the rest of the spring. As a result, the heat causes the material to relax, allowing the hooks to deform and reducing the spring force.

Conventional centrifugal clutches have limited life, requiring frequent maintenance in order to maintain proper power transmission. A need, therefore, exists for an improved centrifugal clutch design which extends the life of the springs used in the clutch.

SUMMARY OF THE INVENTION

It is an object of the invention to provide a centrifugal clutch that is less susceptible to deterioration in its performance caused by overheating of the springs.

The objects and advantages of the present invention are achieved by an improved centrifugal clutch design. The clutch includes a driver which has a central axis about which it can rotate. The driver is adapted to engage with an input shaft. A drum is disposed coaxially about the driver and is adapted to engage a drive component. A plurality of shoes are located between the driver and the drum and arranged about the axis. The shoes are radially movable between an outward position in which the shoes contact a surface of the drum and an inward position in which the shoes are spaced apart from the drum.

Each shoe has a drum contact member which is arranged to contact the drum, and a support which has one end attached to the drum contact member and the other end extending radially inwardly. A pair of spring attachment mounts are formed on the radially inward end of the support.

Adjacent shoes are connected to one another through at least one spring. The spring has two opposed ends, each end engaging with one of the spring attachment mounts on the shoe. The spring urges the shoes toward one another.

In one embodiment, the spring attachment mounts include legs which extend laterally from the support and are spaced apart from the body. Preferably, the legs extend partially circumferentially about the axis. In a preferred embodiment, the spring is a C-shaped spring with first and second ends, and each leg includes a retention lip with a bulbous or edge portion that is designed to retain an end of the spring on the leg.

In another embodiment, the support is attached to the drum contacting member by two arms. The arms are formed integral with the drum contacting member. The arms diverge as they extend radially outward so as to attach to the drum contacting member at locations that are spaced circumferentially from the remainder of the support. The divergence of the arms forms a gap or space between the arms to facilitate cooling of the shoe.

The driver is preferably a hub that includes radial teeth or projections which extend into recesses formed in each shoe. When stationary, the hub may have a sufficiently snug fit against the support so that it acts as a heat sink, assisting in the cooling of the support and reducing heat transmission to the legs where the springs are attached. During operation when the clutch is engaged, the shoes translate relative to the hub such that an air gap is preferably formed between the shoes and the tabs of the hub. The air gap permits air to flow between the two components thereby assisting in cooling the support.

As discussed above, the spring is preferably a C-clip with the ends engaged with lips formed on the legs of adjacent shoes. The preferred embodiments described above results in a shoe arrangement that provides a significant space between the drum contacting member and the springs so as to minimize heat transmission from the drum contacting member to the spring. The spacing also permits air cooling of the spring to further dissipate heat buildup.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For purposes of illustrating the invention, the drawings show one or more preferred forms in which the invention can be embodied. The invention is not, however, limited to the precise forms shown unless such limitation is expressly made in a claim. In the drawings:

DETAILED DESCRIPTION OF THE DRAWINGS

Figure 1:
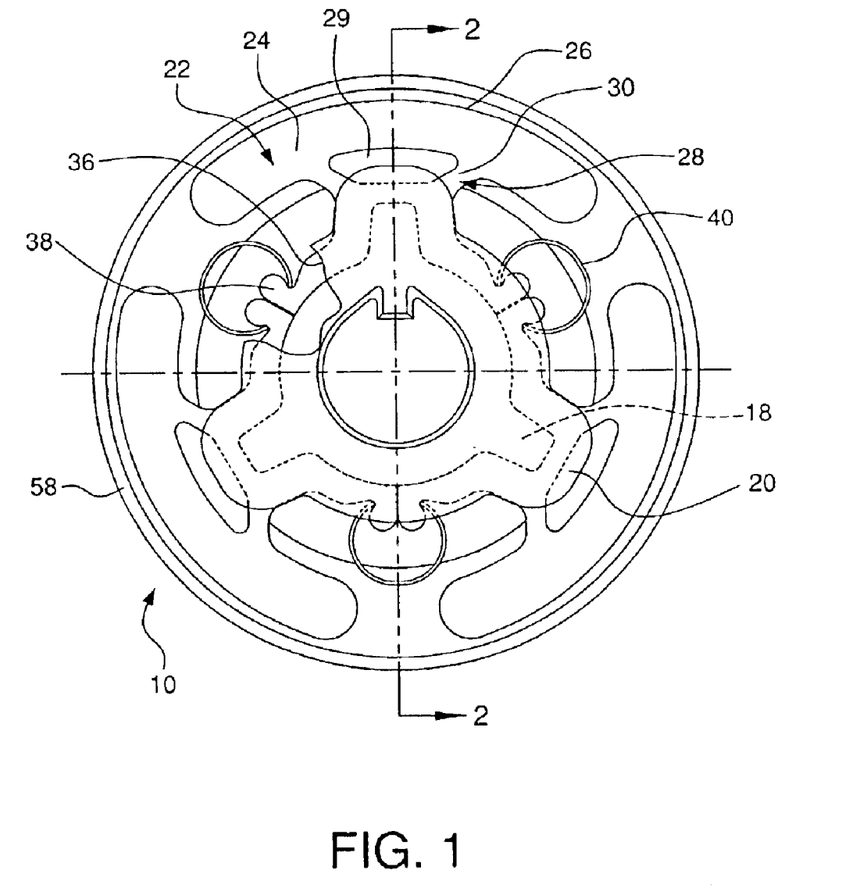
FIG. 1 is an front view of one form of centrifugal clutch according to the invention.
Figure 2:
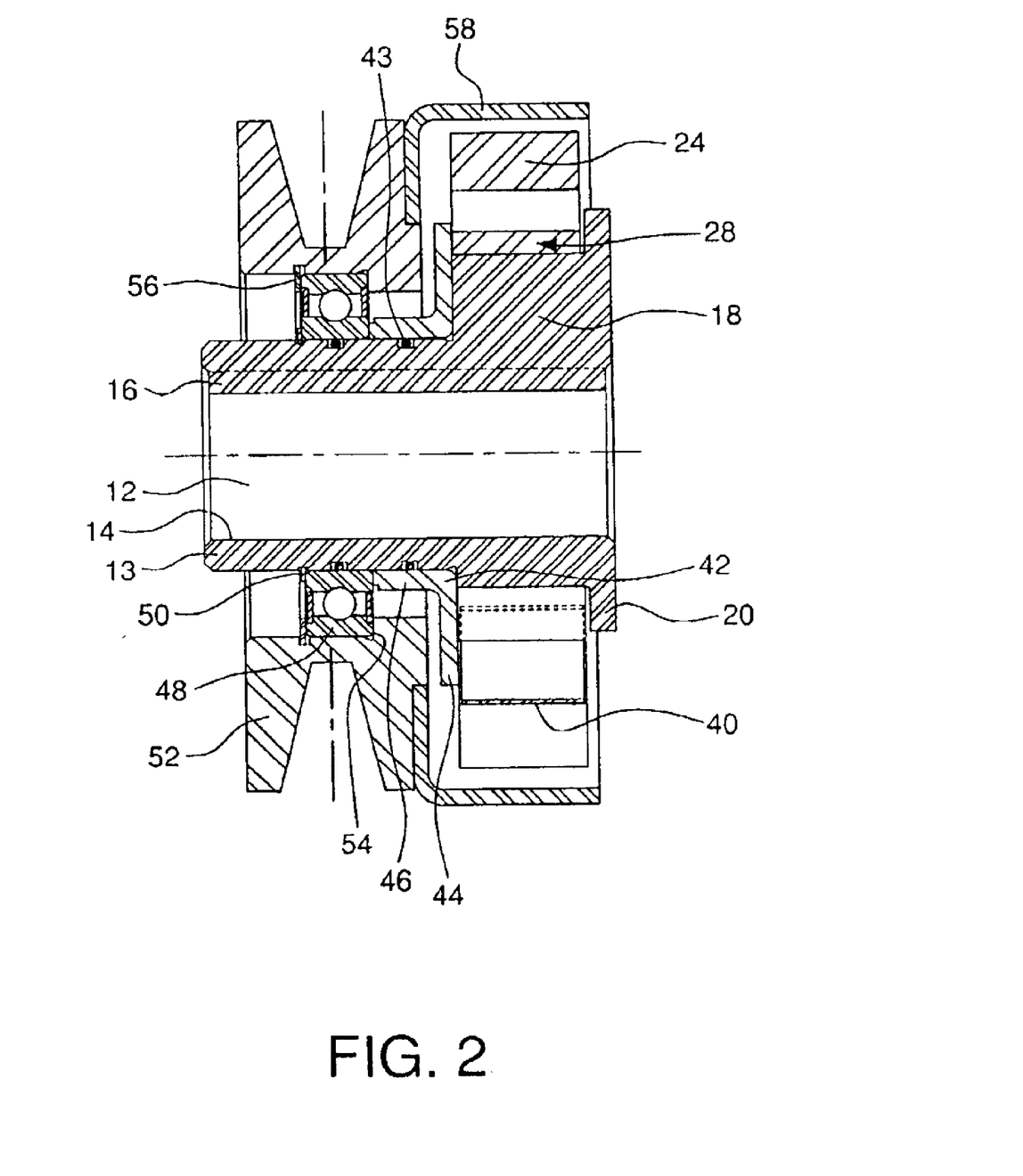
FIG. 2 is a cross-sectional view of the clutch of FIG. 1 taken along the line 2—2 in FIG. 1.
Figure 3:
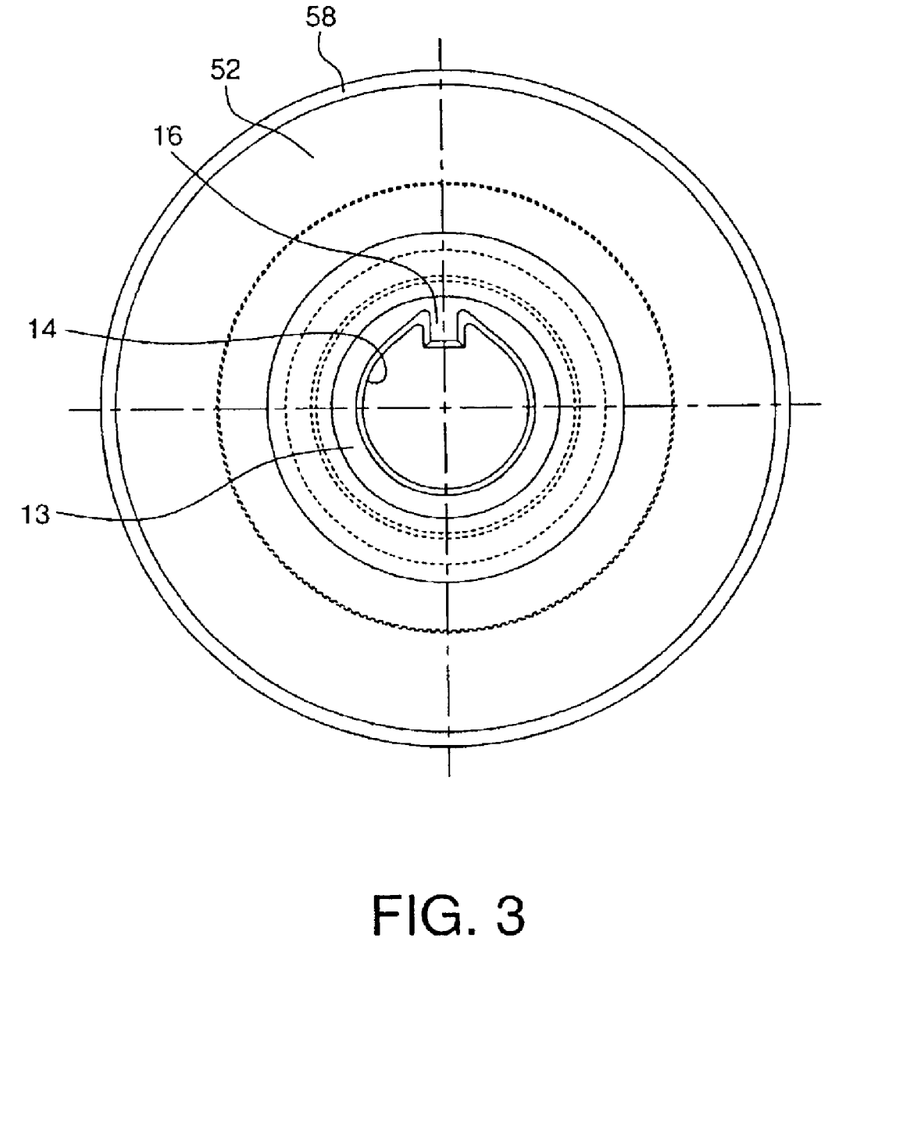
FIG. 3 is a rear view of the clutch shown in FIG. 1.
Figure 4:
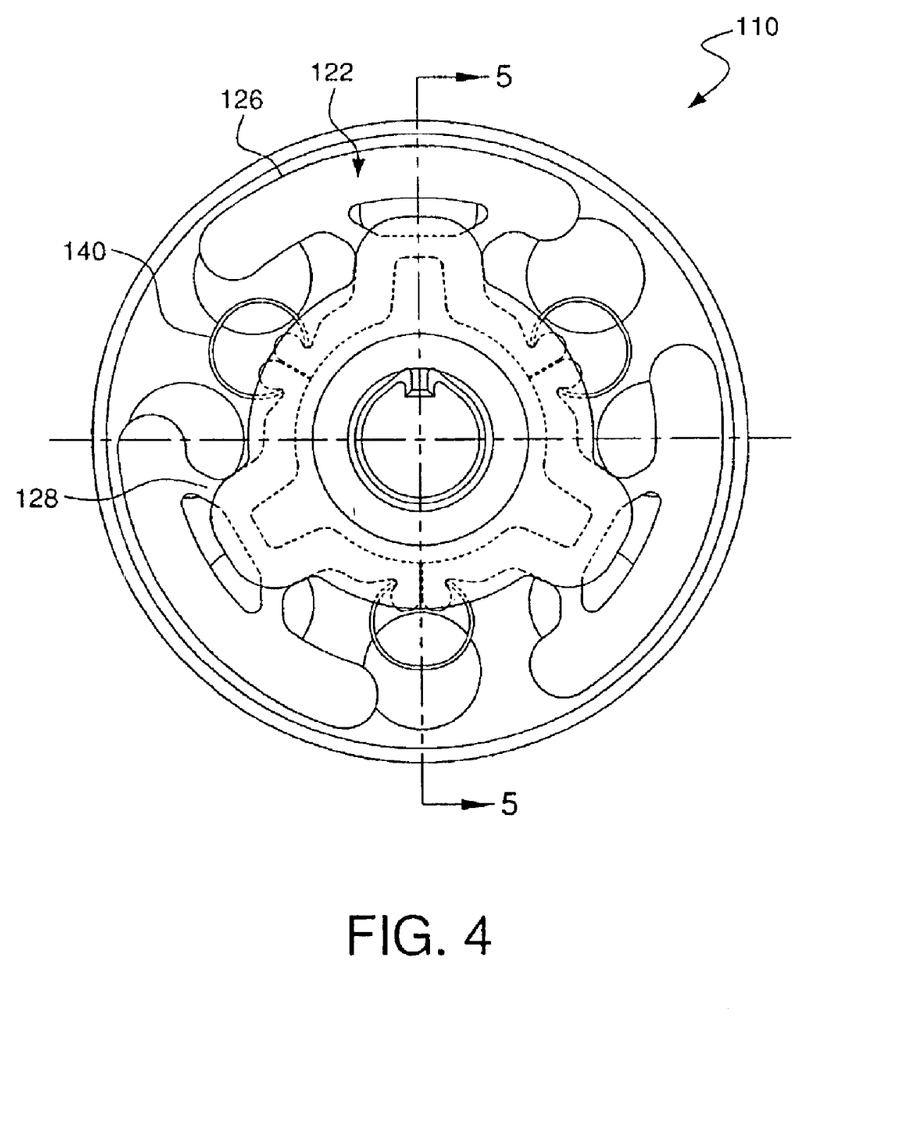
FIG. 4 is a front view of a second form of centrifugal clutch according to the invention.
Figure 5:
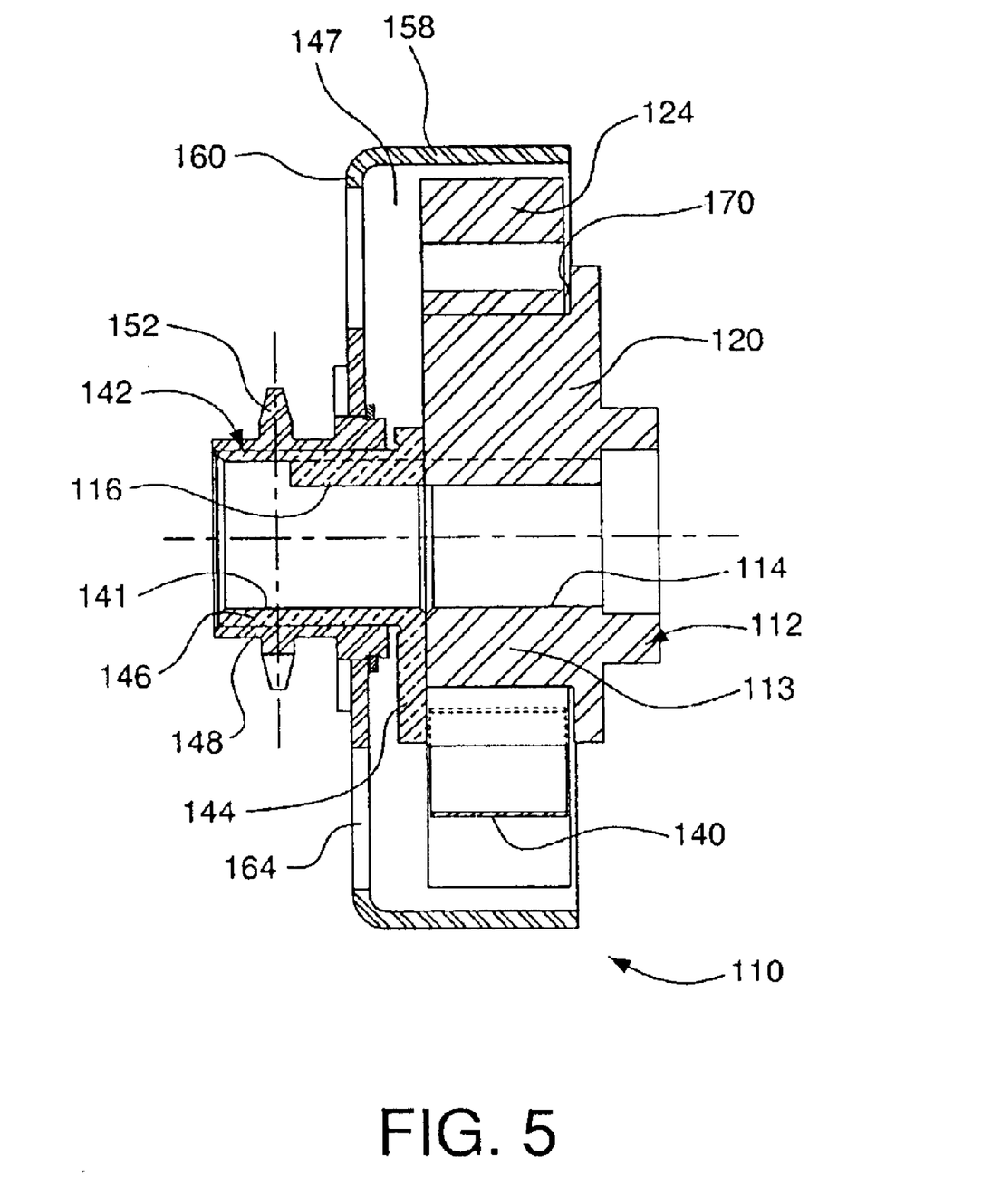
FIG. 5 is a cross-sectional view of the clutch of FIG. 4 taken along the line 5—5 in FIG. 4.
Figure 6:
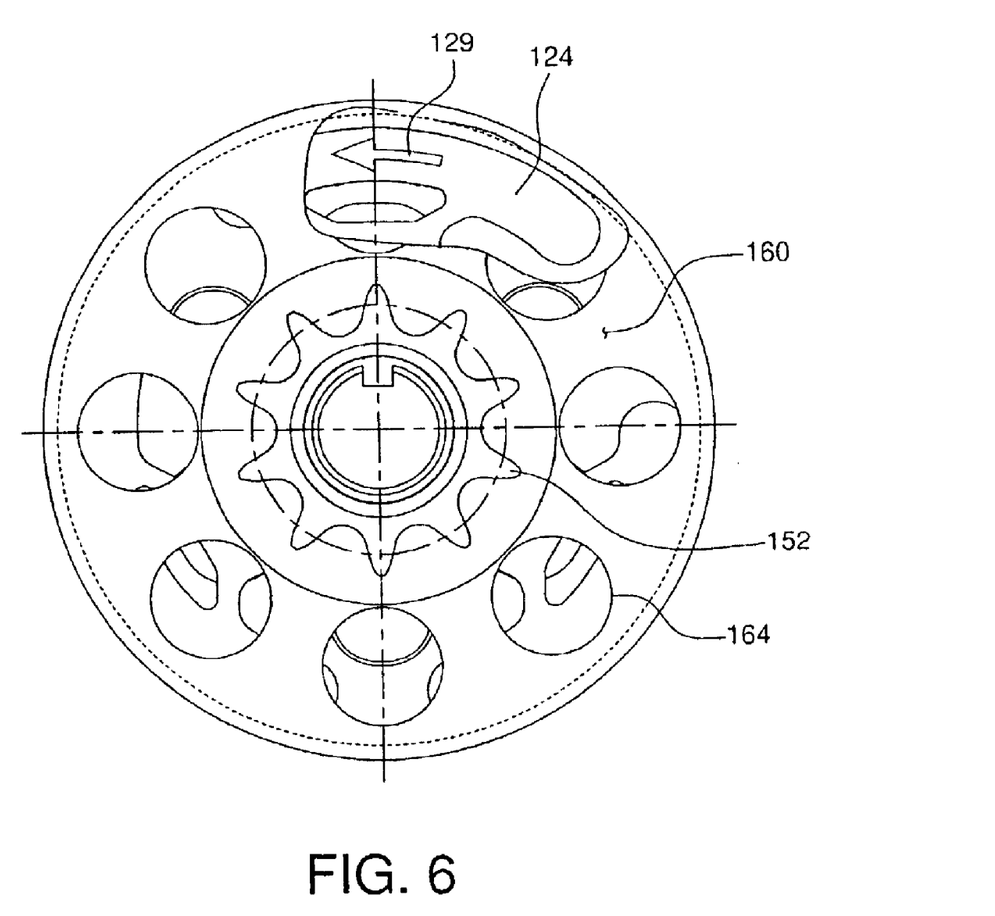
FIG. 6 is a rear view of the clutch shown in FIG. 4.

Referring now to the drawings wherein like numerals represent similar components throughout the figures, there is shown several preferred embodiments of the invention. The invention, however, is not limited to the illustrated embodiments. FIGS. 1 to 3 show one embodiment of centrifugal clutch 10 according to the present invention. The clutch 10 includes a driver or hub 12. The hub 12 is preferably annular with a central opening or bore 14, which is preferably cylindrical in shape. The bore 14 permits the hub 12 to be mounted on an input shaft (not shown) which transmits rotational motion from an engine or similar driving device, to the hub 12. A locking or engagement mechanism 16 is used to attach the hub 12 to the input shaft. In the illustrated embodiment, the locking mechanism includes a key 16 which is formed integral with the hub 12 and is adapted to mate with a corresponding slot or keyway formed in the input shaft. Other types of locking mechanisms can be used in the present invention, such as splines.

The hub 12 also includes a drive mechanism for engaging the hub 12 with one or more shoes as will be discussed in more detail below. In the illustrated embodiment, the drive mechanism includes a plurality of projections or teeth 18 which extend radially outward from the hub 12. The teeth extend along a portion of the axial length of the hub. In one embodiment there are three teeth evenly spaced about the hub circumference.

The teeth 18 may be attached to a flange 20 formed on the end of the hub 12. As is evident from the figures, the flange 20 acts to retain shoes on the hub 12. Each tooth 18 preferably is of uniform cross-section along its axial length, and tapers in the radial direction such that it is narrower at its radially outer tip than at its root end where it joins the core 13 of the hub 12. The peripheral edge of the flange 20 preferably has a curvilinear shape with projections in the regions of the teeth 18. The flange 20 is adapted to prevent the shoes from moving axially past the end of the hub 12, while leaving the areas between the teeth 18 relatively open for access and ventilation.

A clutch shoe 22 is slidably seated on each of the teeth 18. The clutch shoes 22 include a tapered recess that the tooth is located within. Preferably the profile of the recess is generally similar to the profile of the tooth on which the shoe 22 is seated so as to provide a relatively close fit when the shoe 22 is seated on the tooth 18. In one embodiment the taper of the recess is approximately five degrees. The radial depth of the recess is preferably sized such that when the shoe is seated on a tooth, the shoe contacts the hub 12. Preferably, the profile of the recess substantially matches the profile of the tooth.

As is best seen in FIG. 2, each shoe 22 has a drum contact member or body 24, which includes an arcuate outer friction surface 26. The shape is designed to conform to the inner surface of the drum as is conventional in the art. In one embodiment, the drum contact member 24 defines an approximately 90 degree arc, although other arcuate lengths can be used in the present invention. As shown in the figures, this embodiment permits three shoes to cover most of the inner circumference of the clutch drum while leaving gaps between adjacent shoes. The drum contacting member 24 is attached to or formed integral with a support 28. In one preferred embodiment, the support 28 includes two radially extending arms 30 which diverge from each other as shown in FIG. 1. The divergence of the arms 30 forms a gap in the form of an opening 29 between the arms 30 which facilitates cooling of the shoe 22.

The opposite end of the support 28 includes two spring attachment mounts 38. As illustrated, each spring attachment mount 38 preferably includes a leg 36 that extends laterally from the support 28, and a retention lip with a bulbous or edge portion that is designed to retain an end of a spring on the leg 36.

As shown in FIG. 1 and discussed above, a portion of the support extends down the side of the tooth 18, and is shaped to lie in contact with the tooth profile when the clutch is disengaged. The contact between the support 28 and the hub 12 allows the hub to act as a heat sink for heat that is conducting through the support.

The spring attachment mount 38 forms a seat for one end of a spring 40 that connects a spring attachment mount 38 on a shoe to a spring attachment mount 38 on an adjacent shoe. The spring force generated by the springs 40 urges the shoes toward one another. Since the shoes are arranged in a circular pattern, the net effect is that that springs 40 urge the shoes radially inward toward the hub 12. The springs are preferably C-shaped clips. In one embodiment, the C-clip 40 have a preferred spring force of approximately 30 lbf. Suitable springs made from spring steel may be obtained from Newcomb Spring Co., Southington, Conn.

As may be seen from FIG. 1, the spring C-clips 40, when attached to the spring attachment mount 38, are spaced radially apart from the shoe 22, except for the springs ends. Thus, the only direct contact with the metal of the shoes is at the tips of the spring. This minimizes the conduction of heat to the springs 40. The location of the springs also results in increased ventilation and are easily accessible. For example, the C-clip springs may be installed or removed by spreading the arms of the spring apart with a pair of pliers a sufficient amount to disengage the spring's ends from the attachment mounts 38.

Referring to FIG. 2, a spacer 42 is located on the hub 12 on the opposite side of the teeth from the flange 20. The spacer preferably includes a radial flange 44 that rests against the end of the teeth 18 and a cylindrical base part 46 that fits over the core 13 of the hub 12. The flange 44 of the spacer 42 extends radially beyond the tips of the teeth 18, so that the shoes 22 are retained against axial translation by the flanges 20 and 44. The C-springs 40 are also captive between the flanges 20 and 44. An O-ring 43 may be incorporated between the spacer 42 and the hub 12 for noise reduction.

A ball bearing 48 is located about the hub core 13 adjacent to the spacer 42. A retaining clip 50, such as a snap-ring, locks the ball bearing 48 and spacer 42 onto the hub 12.

In the illustrated embodiment, a pulley 52 is disposed about a portion of the hub 12 and, specifically, in contact with an outer race of the ball bearing 48. The pulley 52 provides the torque output from the centrifugal clutch. The ball bearing 48 permits the pulley to rotate freely relative to the hub. The pulley 52 preferably includes a step 54 which contacts and seats against the outer race of the ball bearing 48. A retaining clip 56, such as a snap ring, removably secures the pulley 52 onto the ball bearing 48.

A drum 58 is mounted to or otherwise located on the pulley 52. The drum 58 includes a rim which extends axially over the shoes 22. The drum rim has an inner radius that provides a slight clearance between the shoes 22 and the inner surface of the rim when the clutch is disengaged.

The operation of the clutch will now be discussed. When the clutch 10 is disengaged, the springs 40 urge the shoes 22 toward the hub 12. In this state, the hub 12 and the pulley 52 can rotate freely relative to one another. As such, no torque is transmitted from the input shaft to the output shaft.

Engagement of the hub 12 begins to occur when the speed of rotation of the hub is sufficient enough to generate a centrifugal force on the shoes that is greater than the spring force. The centrifugal force urges the shoes 22 radially outward. The engagement speed is determined based on several factors including the mass distribution of the shoes 22 and the spring force. As the shoes 22 move outward, the outer friction surface 26 contacts the inside of the drum rim. The frictional force generated by that contact transmits torque from the shoe to the drum.

As discussed above, it is common in centrifugal clutches for heat to develop during operation as the friction surface 26 slides or slips relative to the drum. In the present invention, the majority of the heat is conducted to the drum and dissipated. The remainder of the heat is conducted from the body 24 down the arms 28. Since the arms 28 are comparatively long and narrow, and are exposed to the air on both sides, there will be significant dissipation of heat to the air. Any remaining heat will be conducted through the support toward the hub. As shown, the spring attachment mounts 38 are located at the distil end of the support. As such, the length of the support, including the legs and the open exposure of the support to air, inhibit significant heat built-up at the ends. In addition, the leg 36 positions the spring attachment mount 38 at a location that is laterally apart from the support and the body. Furthermore, since the shoes are designed to slide radially outward, such movement results in an air gap between the support and the hub, providing an additional means for cooling the support. Any heat developed in the support will begin to radiate into the gap. In one embodiment the gap formed by the movement of the shoe is approximately 0.080 of an inch which provides sufficient cooling.

Even if the spring attachment support becomes hot, only the very tip of the spring C-clip 40 is in contact with the support. This portion of the clip is not greatly stressed. Creep becomes a problem only if the middle part of the spring C-clip becomes hot. That requires heat to be conducted along the entire spring, which is comparatively long and thin, and is exposed to cooling air on both sides.

As a result, the embodiment of the centrifugal clutch 10 shown in FIGS. 1–3 has been found to be markedly less susceptible to the springs developing thermal creep due to heat than are comparable existing clutches.

Referring now to FIGS. 4 to 8, a second embodiment of a clutch according to the invention is shown. This embodiment is generally similar to the first form shown in FIGS. 1 to 3. Equivalent features are identified by reference numerals increased by 100 from those used in FIGS. 1 to 3.

The second embodiment of the clutch which is particularly useful in a go-kart is generally indicated by the reference numeral 110 in FIGS. 4–8. In this embodiment, the clutch 110 has a hub 112 which is shorter than the hub 12 shown in FIG. 1. The hub 112 has a generally cylindrical core 113 defining a central bore 114 with an integral key 116 extending over most of its length, to fit onto a slotted drive shaft (not shown). The hub 112 preferably has three teeth 118, extending radially and axially, and evenly spaced around its circumference. However, as with the prior embodiment, the number of teeth may be varied. Each tooth 118 is preferably of uniform cross-section along its axial length, and tapers radially outward.

The hub 112 includes a flange 120 on the end of the hub 112. As with the prior embodiment, the flange 120 prevents the shoes from moving axially relative to the hub 112. As may be seen in FIG. 5, the flange 120 is comparatively thin. It, therefore, acts to quickly dissipate heat.

Seated on each of the teeth 118 is a clutch shoe 122. The clutch shoes 122 are substantially the same as in the prior embodiment. As such, no further discussion is needed except as noted herein.

A bushing 142 is located adjacent to the side of the hub opposite from the flange 120. The bushing 142 includes a flat radial flange 144 that contacts the ends of the teeth 118 and a cylindrical base portion 146. The bushing 142 includes a central bore 141 which is similar in size and shape to the bore 114 in the hub 112. A key 116 is formed in the bushing 142 and the hub 112. As may be seen in FIG. 5, the flange 144 of the bushing 142 extends radially beyond the tips of the teeth 118 and does not overlap the C-springs 140. This allows free circulation of air between the shoes and C-springs and an air space 147.

A sleeve 148 is rotatably disposed about the bushing 142. The sleeve includes a sprocket 152 which serves as the power output from the clutch 110.

The sleeve 148 carries a housing 158, which has a radial portion 160 and a drum 162 extending axially from the outer edge of the radial portion over the shoes 122. One or more ventilation holes 164 are preferably formed in the radial portion 160 of the drum 158. The ventilation holes permit air to flow through the clutch 110 from one end to the other, thus cooling down the shoes 122.

Figure 7:
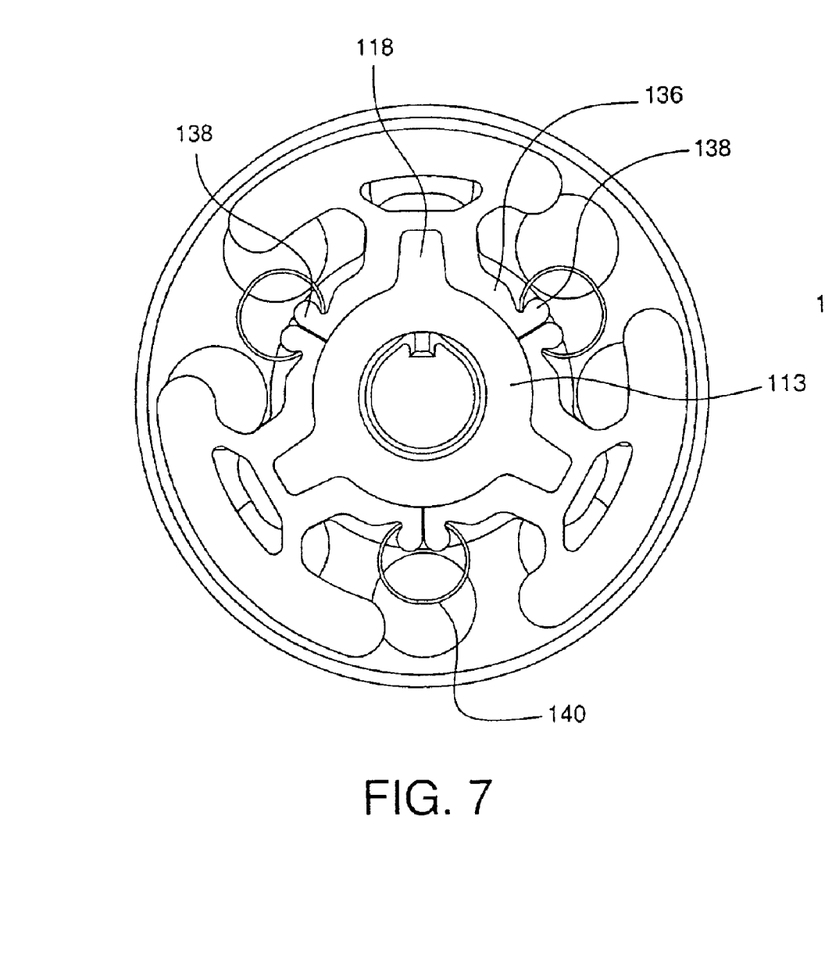
FIG. 7 illustrates the clutch of FIG. 4 in its disengaged position.
Figure 8:
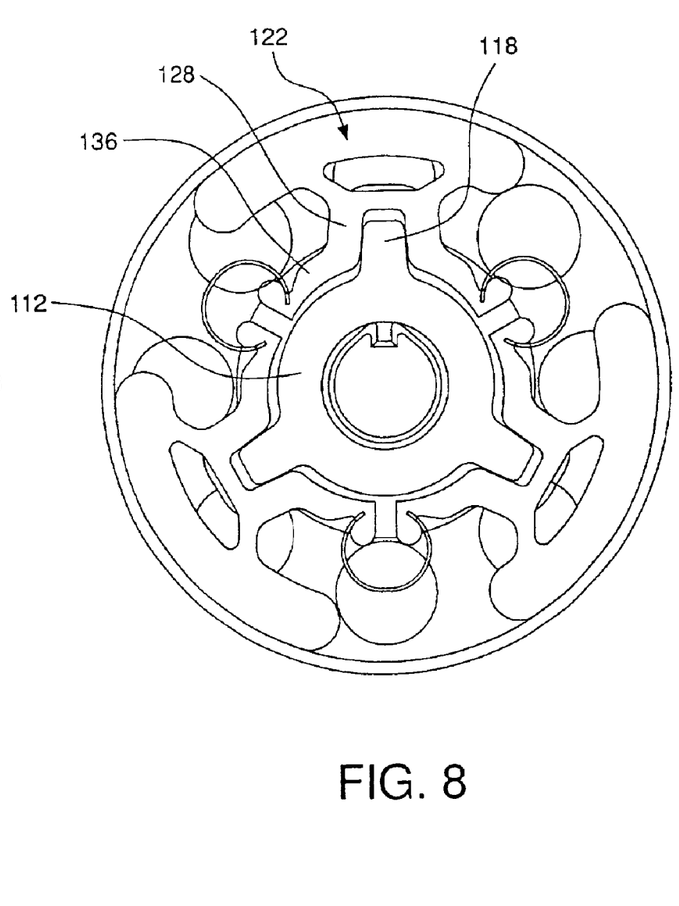
FIG. 8 illustrates the clutch of FIG. 7 in its engaged position.

The operation of the clutch 110 in FIGS. 4–8 is similar to the operation of the first embodiment. Thus, no further discussion is needed. FIGS. 7 and 8 illustrate the clutch in its disengaged and engaged states, respectively.

Figure 9:
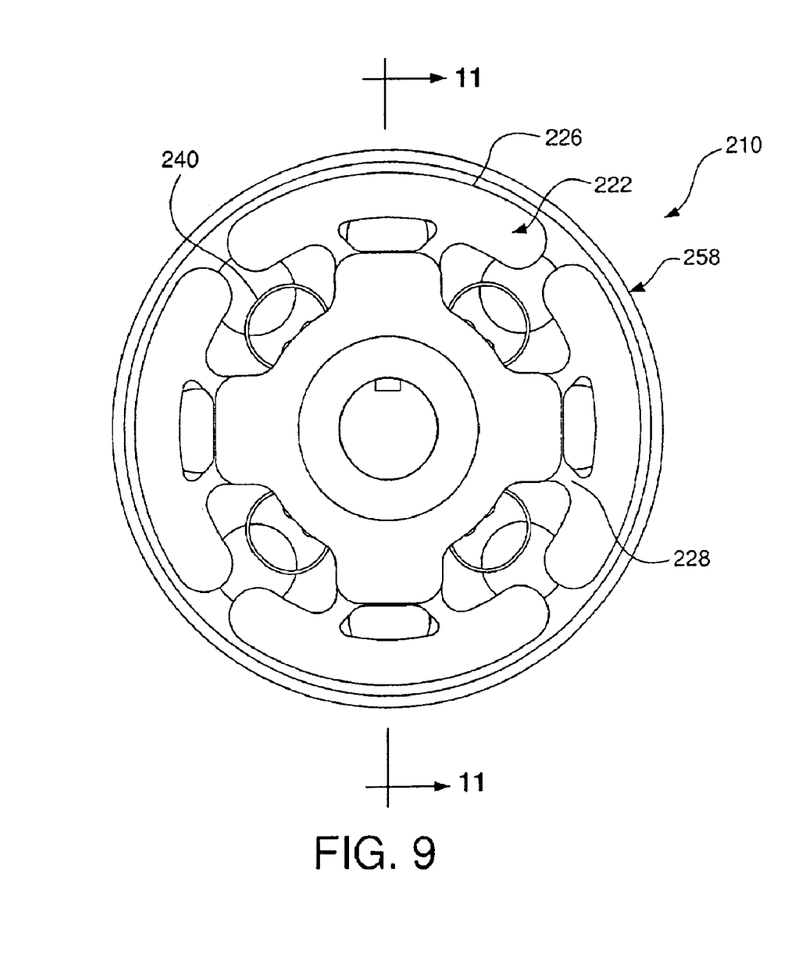
FIG. 9 is a front view of a third form of centrifugal clutch according to the invention.
Figure 10:
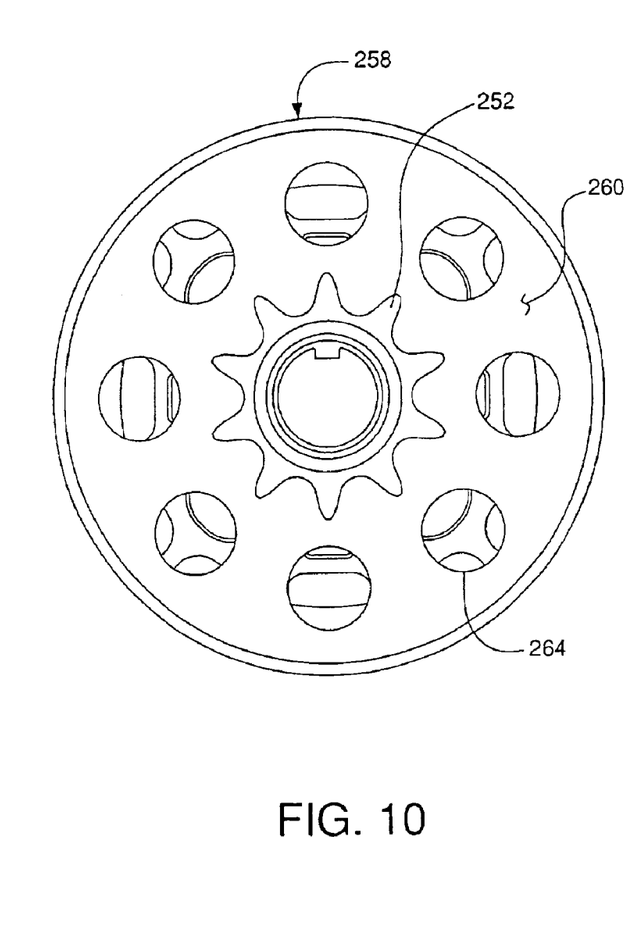
FIG. 10 is a rear view of the clutch shown in FIG. 9.
Figure 11:
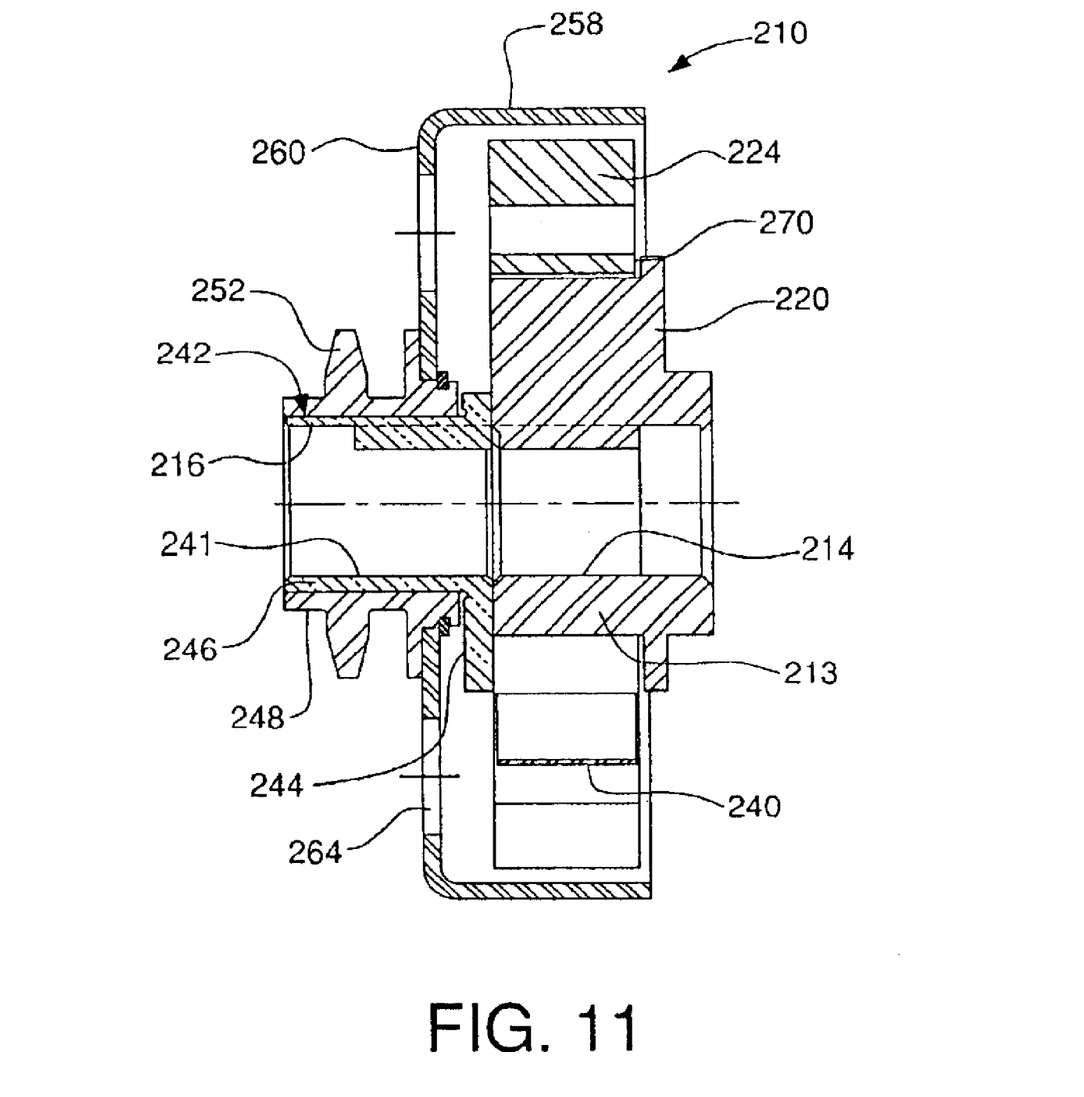
FIG. 11 is a cross-sectional view of the clutch of FIG. 9 taken along the line 11—11 in FIG. 9.
Figure 12:
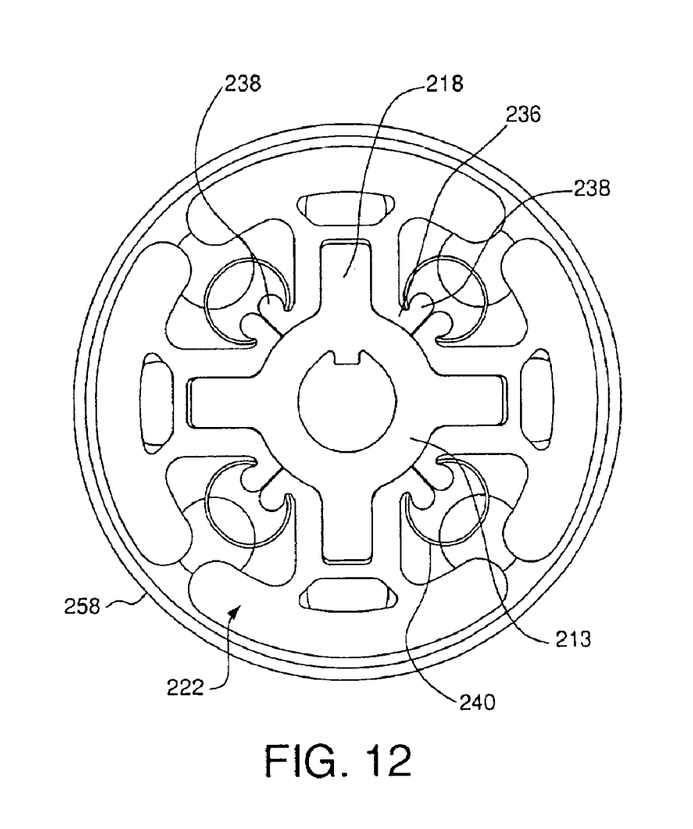
FIG. 12 illustrates the clutch of FIG. 9 in its disengaged position.
Figure 13:
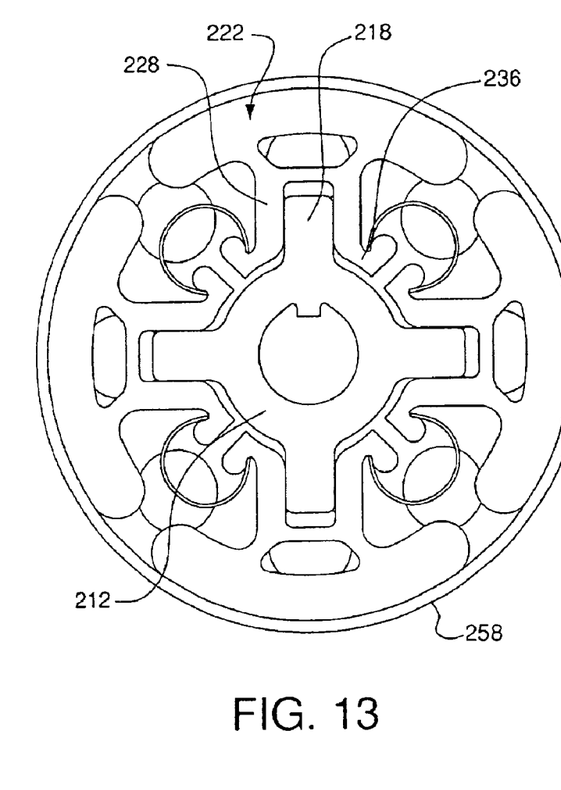
FIG. 13 illustrates the clutch of FIG. 9 in its engaged position.

Referring now to FIGS. 9–13, a preferred embodiment of the present invention is shown which permits bi-directional operation. In this embodiment of the invention, many of the components are the same as those described above with respect to the second embodiment. (For clarity, only a few of the components from the embodiment shown in FIGS. 4–8 are identified. These components are preceded by the numeral "2" instead of "1".) However, in this embodiment, as shown in FIGS. 9, 12 and 13, there are four shoes 222 used in the clutch 210. The shoes are spaced equally about the hub 212.

One of the primary differences in the embodiment shown in FIGS. 9–13 is the use of a substantially straight teeth 218. That is, there is no or very little taper of the teeth 218. Similarly, the supports 228 on shoes 222 are also substantially straight. This design provides for smoother engagement of the shoes 222 during operation.

FIGS. 12 and 13 show this embodiment of the invention in its engaged and disengaged positions.

Although three embodiments of the centrifugal clutch have been described and shown in the drawings, those skilled in the art will understand how features from the three embodiments may be combined, interchanged and varied.

Although the clutch 10 has been shown with a ball bearing 48 and the clutches 110, 210 with plain bearings 142, 242, it will be appreciated that any appropriate structure may be used to support the hub and the drum in alignment with one another while permitting relative rotation, depending on the demands of a specific use.

Also, while the clutches 10, 110 and 210 have been shown with one end of the drum open, exposing the clutch shoes 22, 122, 222 and springs 40, 140, 240 it could be covered, at least partially, to prevent the entry of dust and dirt that might interfere with the operation of the clutch. However, it is preferred that any such cover be provided with ventilation holes similar to the ventilation holes 164, 264 or with other open areas to allow the circulation of cooling air.

Preferably the shoes are formed from powdered metal and the drums from steel.

For simplicity and robustness, the friction surfaces 26, 126, 226 of the shoes 22, 122, 222 and the inside surface of the drum 58, 158, 258 may be the same bare material, from which the shoes and drum are made, such as powdered metal or steel, however a friction lining could also be used.

The present invention has particular use in go-karts and similar vehicles, which can operate at speeds between 2000 RPM and 6500 RPM. The invention can also be used in various outdoor power equipment, such as wood chippers and chain saws, which typically operate below 20 hp.

In one practical application where a conventional clutch with a garter spring showed appreciable relaxation of the spring after 30 minutes in service, a clutch similar to that shown in FIGS. 4–13 showed no appreciable relaxation after 36 hours in service.

The foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A centrifugal clutch comprising:
   a driver having a rotational axis and adapted to engage an input shaft;
   a drum coaxial with the driver and adapted to engage a driven component;
   a plurality of shoes located between the driver and the drum and arranged about the axis, the shoes being radially movable between an outward position in which the shoes contact a surface of the drum and an inward position in which the shoes are spaced apart from the drum, each shoe having a drum contacting member which is arranged to contact a portion of the drum, a support with one end attached to the drum contacting member and the other end extending radially inward to be engaged by the driver, the support including a pair of spring attachment mounts formed on the radially inward end of the support; and
   a plurality of springs, each spring engaging two adjacent shoes by attaching to one spring attachment mount on each shoe, the spring biasing the shoes toward one another.

2. A centrifugal clutch according to claim 1 wherein the spring attachment mounts include legs which extend laterally from the support and are spaced apart from the drum contacting member.

3. A centrifugal clutch according to claim 2 wherein the legs extend from opposite sides of the support.

4. A centrifugal clutch according to claim 3 wherein each leg includes a spring retention lip, and wherein each spring is a C-clip spring having first and second ends, each end being engaged with a spring retention lip on a leg.

5. A centrifugal clutch according to claim 1, wherein the plurality of springs are C-shaped springs, each having opposed ends which engage with the spring attachment mounts.

6. A centrifugal clutch according to claim 5, wherein the attachment mount includes a lip for retaining an end of an associated C-shaped spring.

7. A centrifugal clutch according to claim 6 wherein the lip includes a bulbous portion which assists in retaining the C-shaped spring on the attachment mount.

8. A centrifugal clutch according to claim 1, wherein the driver includes a plurality of radial teeth, at least one radial tooth being disposed within a recess formed in the support, and wherein the load transfer between the shoes and the driver is provided by the contact between the teeth and the support.

9. A centrifugal clutch according to claim 8, wherein there are three shoes, each shoe having one recess and wherein the driver has three teeth.

10. A centrifugal clutch according to claim 1, wherein when the shoes are in the outward position the shoes and the driver define between them a passage for flow of air through the clutch.

11. A centrifugal clutch comprising:
a driver having a rotational axis and adapted to engage an input shaft;
a drum coaxial with the driver and adapted to engage a driven component;
a plurality of shoes located between the driver and the drum and arranged about the axis, the shoes being radially movable between an outward position in which the shoes contact a surface of the drum and an inward position in which the shoes are spaced apart from the drum, each shoe having a drum contacting member which is arranged to contact a portion of the drum, a support with one end attached to the drum contacting member and the other end extending radially inward, the support including a pair of spring attachment mounts formed on the radially inward end of the support; and
a plurality of springs, each spring engaging two adjacent shoes by attaching to one spring attachment mount on each shoe, the spring biasing the shoes toward one another;
wherein the attachment of the support to the drum contacting member is provided by two arms formed integral with the drum contacting member and the support, the arms diverging as they extend radially outward so as to attach to the drum contacting member at locations that are spaced circumferentially from the remainder of the support, the divergence of the arms forming a gap between the arms.

12. A centrifugal clutch comprising:
a driver having a rotational axis and adapted to engage an input shaft;
a drum coaxial with the driver and adapted to engage a driven component;
a plurality of shoes located between the driver and the drum and arranged about the axis, the shoes being radially movable between an outward position in which the shoes contact a surface of the drum and an inward position in which the shoes are spaced apart from the drum, each shoe having a drum contacting member which is arranged to contact a portion of the drum, a support with one end attached to the drum contacting member and the other end extending radially inward, the support including a pair of spring attachment mounts formed on the radially inward end of the support; and
a plurality of springs, each spring engaging two adjacent shoes by attaching to one spring attachment mount on each shoe, the spring biasing the shoes toward one another;
wherein the driver is located centrally between the shoes, wherein each spring attachment mount includes a leg which extends laterally from opposite sides of the support and wherein in the radially inward position the springs hold at least a portion of the leg in contact with the driver.

13. A centrifugal clutch according to claim 12, wherein in the radially inward position the legs contact the driver over substantially the whole length of the legs.

14. A centrifugal clutch comprising:
a driver having an axis and being adapted to engage an input shaft;
a drum coaxial with the driver and adapted to engage a driven component;
a plurality of shoes arranged about and engaged with the driver, each shoe being movable between a radially outward position in which the shoes contact the inside of the drum and a radially inward position in which the shoes do not contact the drum, each shoe including a drum contacting member and a support attached to the drum contacting member and extending radially inward, the support having at least one spring mount formed near a radially inward end of the support; and
a plurality of C-shaped springs, each spring having respective ends for engaging two adjacent shoes and a middle between the ends, each end being removably engaged with a spring mount on a shoe, the spring biasing the adjacent shoes toward one another, and the ends of each C-shaped spring being radially inward of the middle of the spring.

15. A centrifugal clutch according to claim 14, wherein each said shoe has two spring mounts, each spring mount including a leg with a lip, the end of the spring engaging the lip.

16. A centrifugal clutch according to claim 15 wherein the lip includes a bulbous portion which assists in retaining the end of the spring on the mount.

17. A centrifugal clutch comprising:
a driver having an axis and being adapted to engage an input shaft;
a drum coaxial with the driver and adapted to engage a driven component;
a plurality of shoes arranged about and engaged with the driver, each shoe being movable between a radially outward position in which the shoes contact the inside of the drum and a radially inward position in which the shoes do not contact the drum, each shoe including a drum contacting member having two circumferential ends and a middle part between the ends and a support extending radially inward from the middle part of the drum contacting member, the support having one end attached to the drum contacting member and having two legs formed on the other end, the legs extending circumferentially outward from the support; and
a plurality of springs, each spring having a first end engaged with a leg of one shoe and a second end engaged with a leg on an adjacent shoe, the spring urging the shoes toward one another.

18. A centrifugal clutch according to claim 17 wherein there are at least three shoes, and wherein the spring is a C-shaped spring.

19. A centrifugal clutch according to claim 17, wherein the engagement between the driver and the shoes is provided by a plurality of radially extending teeth formed on the driver and recesses formed in the shoes, each shoe adapted to slide on a corresponding said tooth with the tooth in a recess formed in the shoe, wherein the contact between the shoes and the teeth provides load transmission between the shoe and the driver.

20. A centrifugal clutch according to claim 19, wherein when the shoes are in the outward position the shoes and the driver define between them a passage for flow of air through the clutch.

* * * * *